W. JOHNSTON.
FENDER.
APPLICATION FILED SEPT. 11, 1914.

1,167,408.

Patented Jan. 11, 1916.
3 SHEETS—SHEET 1.

Witnesses
M. P. McKee
J. M. Bowie

Inventor
W. Johnston
Alex. J. Wedderburn, Jr.
Attorney

W. JOHNSTON.
FENDER.
APPLICATION FILED SEPT. 11, 1914.

1,167,408.

Patented Jan. 11, 1916.
3 SHEETS—SHEET 2.

Witnesses
M. P. McKee
J. M. Bowie

Inventor
W. Johnston

Alex J. Wedderburn, Jr.
Attorney

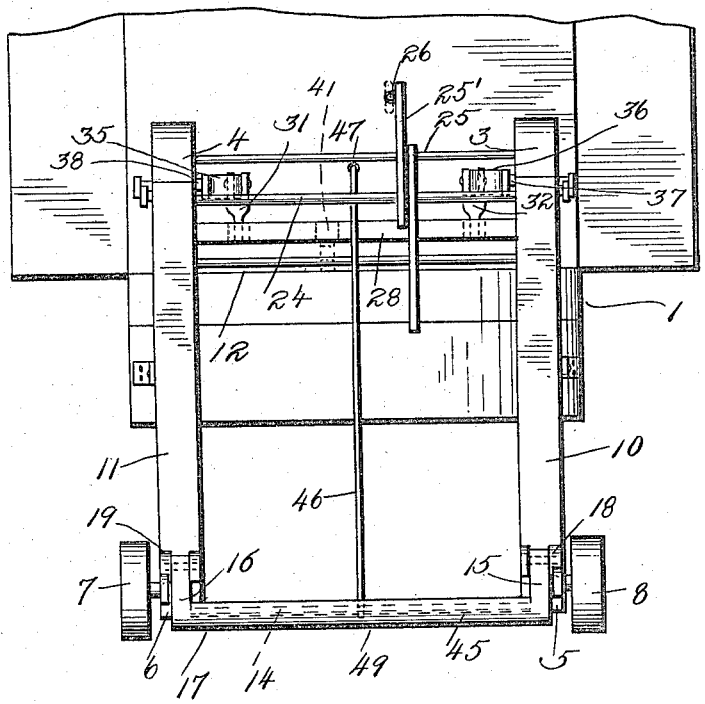

UNITED STATES PATENT OFFICE.

WILLIAM JOHNSTON, OF WASHINGTON, PENNSYLVANIA.

FENDER.

1,167,408.  Specification of Letters Patent.  Patented Jan. 11, 1916.

Application filed September 11, 1914. Serial No. 861,320.

*To all whom it may concern:*

Be it known that I, WILLIAM JOHNSTON, a citizen of the United States, residing at Washington, in the county of Washington and State of Pennsylvania, have invented certain new and useful Improvements in Fenders, of which the following is a specification.

This invention relates to improvements in fenders and has for its object to provide a fender having a normally horizontally disposed scoop frame and tripping means whereby said frame may be instantly lowered to an inclined position.
Another object of the invention is to provide a fender adapted to be folded and means whereby said fender may be folded from a car.

Another object of the invention is to provide means for holding a fender in a raised position and means connected with the car whereby the fender may be set to a lowered position.

With the above and other objects in view which will be farther on more fully explained, I have invented the device illustrated in the accompanying drawings in which—

Figure 1:
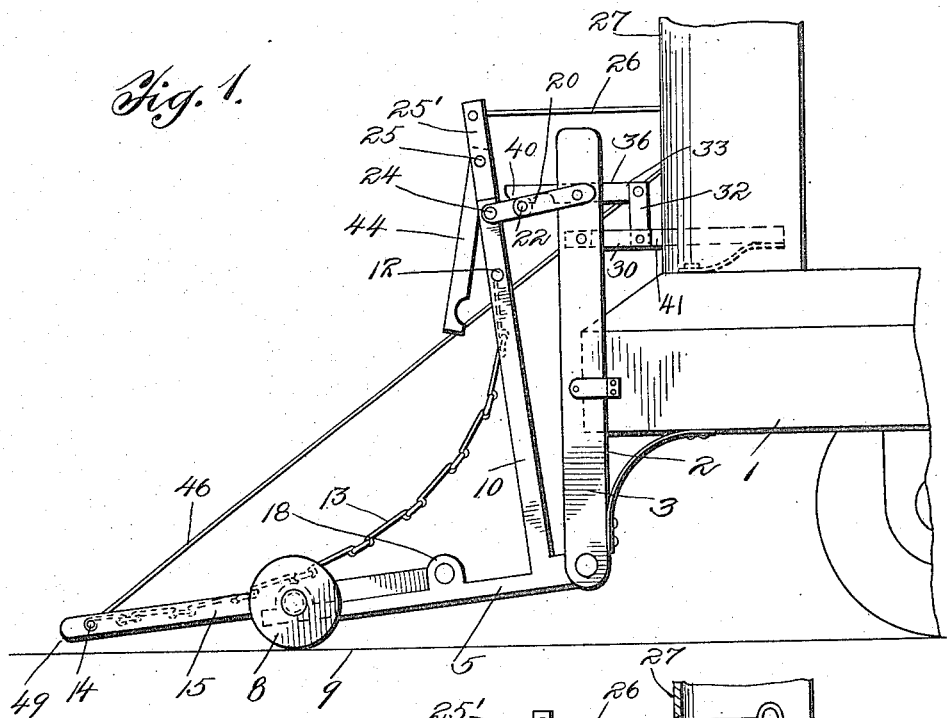
Figure 2:
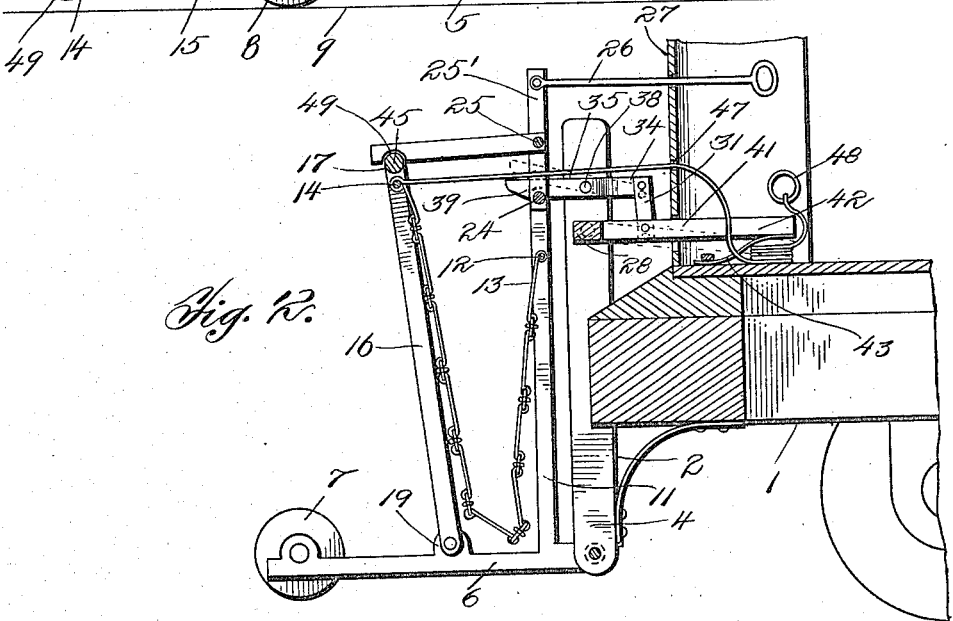
Figure 3:
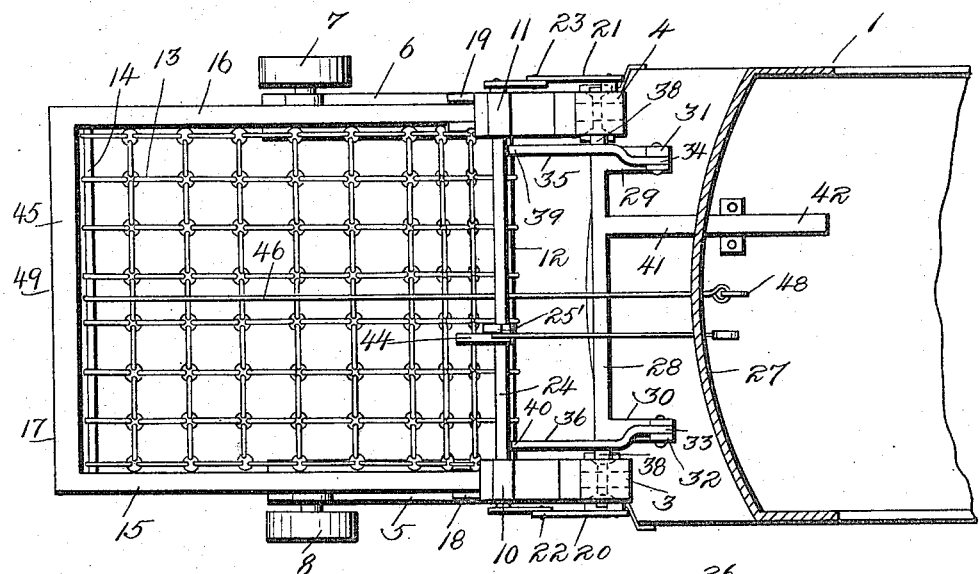
Figure 4:
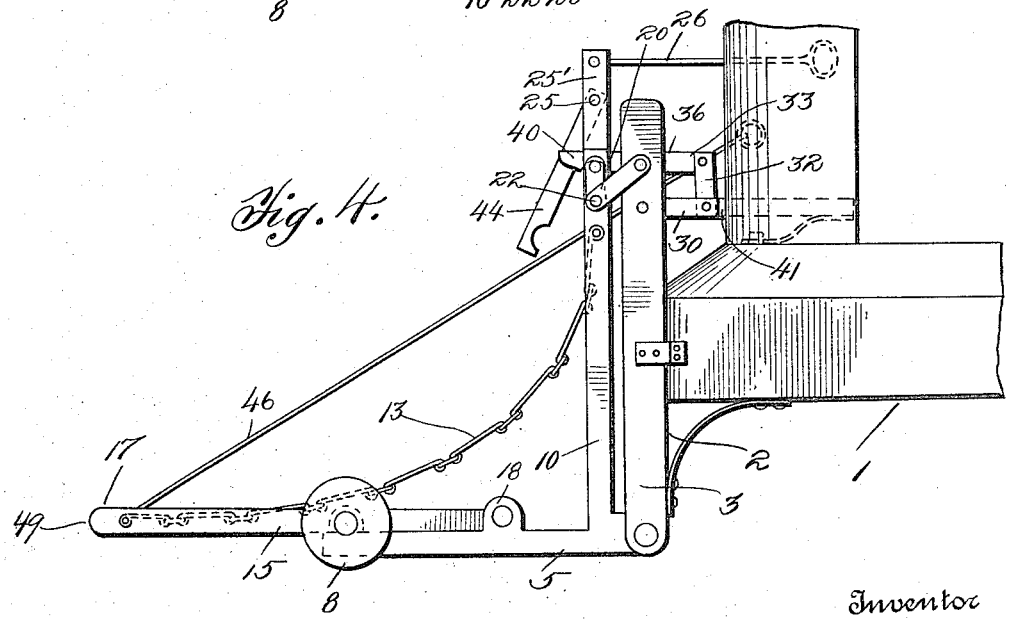

Figure 1 is an elevational view of my fender in an operative or tripped position, Fig. 2 is a similar view of the device shown in a folded position. Fig. 3 is a top plan view of Fig. 1. Fig. 4 is an elevational view of the fender shown in an unfolded raised position, and Fig. 5 is a front elevational view of the device shown in an unfolded position with the scoop removed.

Like reference characters indicate like parts throughout the specification, and in the several views in the drawings, in which—

1 indicates the forward end of a car to which a vertically disposed frame 2, embracing uprights 3 and 4 is connected. Pivotally mounted upon the lower end of said uprights are normally horizontally disposed arms 5 and 6, having wheels 7 and 8, on their outer ends which are adapted to engage the ground or rail 9. The arms 5 and 6, are provided with integral right angular normally vertically disposed uprights 10 and 11 to the upper ends of which is fixed a rod 12, which carries the upper end of a flexible scoop 13, the lower end of which is carried by a rod 14, mounted in the forward end of the arms 15 and 16, of the U-shaped member 17. The free ends of the arms 15 and 16, are pivotally mounted in the bearings 18 and 19, on the arms 5 and 6, said U-shaped member being supported in a lowered position by said arms 5 and 6. The upper end of the member 10 is connected to the upper end of the scoop holder 3 by means of a pivoted brace 20, which is formed by a pair of links which are pivotally connected together at 22. A rod 24 mounted upon the members 10 and 11, and the rod 25 above said rod 24, also mounted upon said arms 10 and 11, form a support for the upright member 25′, which acts as a lever by means of which a scoop carrying mechanism may be set to a raised position, the rod 26, connected to the upper end of said member 25, projecting through the dash board 27 of the car 1, and having a hand grip on the inner end thereof whereby said rod 26 may be manually controlled. Pivotally mounted upon the members 3 and 4 is a bar 28, having right angular inwardly extending arms 29 and 30 upon the free ends of which are pivoted links 31 and 32, to the upper ends of which are pivotally connected the inner ends 33 and 34, of the levers 35 and 36 which are pivotally mounted at 37 and 38 to the members 3 and 4. The outer ends of the levers 35 and 36 form hooks 39 and 40 which are adapted to engage the rod 24 and thereby hold the members 10 and 11 in a vertical position. Integrally connected to the member 28, is a lever 41, the inner end 42 of which projects through the dash board 27 and rests normally upon the upper end of the spring 43, which is adapted to hold said lever 41 in a normally horizontal position, thereby holding the hooks 39 and 40, into engagement with the rod 24. By pressing down upon the end 42 of the member 41 the links 31 and 32 are drawn down and the hooks 39 and 40 are raised up out of engagement with the rod 24 whereby the uprights 10 and 11 will, through the weight of the member 17, and the arms 5 and 6, swing to the inclined position indicated in Fig. 1. Pivotally mounted to the member 25 is a hook member 44 which is adapted to engage the transverse bar 45 of the U-shaped member 17, and hold said member in an upright or folded position, as indicated in Fig. 2 of the drawings. Connected to the rod 14 is a flexible cable 46, the other end of which projects through the opening 47 in the dash board 27 and is provided with a hand hold 48, on its free end. By means of this cable the fender may be folded from the inside of the car.

From the foregoing specification it will be seen that I have provided a fender which normally will be held in a position out of contact with the surface or rails of the car track but which may be instantly thrown into engagement with the surface or car tracks in order that the outer end 49 of the fender will be so near the ground that when it comes into contact with a person, said person will be tripped and thrown over on to the scoop 13 and by no possibility could a person struck by the fender when in its lowered position be forced thereunder. It will also be seen that the fender may readily be operated from the interior of the car to cause it to assume its normal inoperative or its folded position as desired.

Having now described my invention, that which I claim to be new and desire to procure by Letters Patent is:—

1. A fender having horizontal arms pivoted at their inner ends, uprights carried thereby forming a frame, an extension frame pivoted thereto and a flexible scoop, said arms and uprights being integral.

2. A fender having horizontal arms pivoted at their inner ends, uprights carried thereby forming a frame, an extension frame pivoted thereto and a flexible scoop, said arms and uprights being integral forward of said pivoted ends.

3. A fender having horizontal arms pivoted at their inner ends, uprights carried thereby forming a frame, an extension frame pivoted thereto and a flexible scoop, said arms and uprights being integral forward of said pivoted ends, and wheels on the forward ends of said arms.

4. A fender having horizontal arms pivoted at their inner ends, uprights carried thereby forming a frame, an extension frame pivoted thereto and a flexible scoop, said arms and uprights being integral forward of said pivoted ends, and wheels on the forward ends of said arms, said extension frame consisting of arms pivoted to said first arms.

5. A fender having horizontal arms pivoted at their inner ends, uprights carried thereby forming a frame, an extension frame pivoted thereto and a flexible scoop, said arms and uprights being integral forward of said pivoted ends, and wheels on the forward ends of said arms, said extension frame consisting of arms pivoted to said first arms centrally thereof.

6. A fender having horizontal arms pivoted at their inner ends, uprights carried thereby forming a frame, an extension frame pivoted thereto and a flexible scoop, said arms and uprights being integral forward of said pivoted ends, and wheels on the forward ends of said arms, said extension frame consisting of arms pivoted to said first arms centrally thereof, and projecting therebeyond when lowered.

7. A fender having horizontal arms pivoted at their inner ends, uprights carried thereby forming a frame, an extension frame pivoted thereto and a flexible scoop, said arms and uprights being integral forward of said pivoted ends, wheels on the forward ends of said arms, said extension frame consisting of arms pivoted to said first arms centrally thereof, and projecting therebeyond when lowered, and a rigid controller rod for raising said fender.

8. A fender having horizontal arms pivoted at their inner ends and uprights carried thereby forming a frame and a flexible scoop carried thereby, said arms and uprights being integrally connected outwardly of said pivoted ends, wheels on the ends of said arms, an extension frame pivoted to said arms centrally thereof and projecting therebeyond when lowered, a rigid controller rod for raising said fender and a flexible cable for raising said extension.

9. A fender having horizontal arms pivoted at their inner ends and uprights carried thereby forming a frame and a flexible scoop carried thereby, said arms and uprights being integrally connected outwardly of said pivoted ends, wheels on the ends of said arms, an extension frame pivoted to said arms centrally thereof and projecting therebeyond when lowered, a rigid controller rod for raising said fender, a flexible cable for raising said extension and means for holding said fender in raised position.

10. A fender having horizontal arms pivoted at their inner ends and uprights carried thereby forming a frame and a flexible scoop carried thereby, said arms and uprights being integrally connected outwardly of said pivoted ends, wheels on the ends of said arms, an extension frame pivoted to said arms centrally thereof and projecting therebeyond when lowered, a rigid controller rod for raising said fender, a flexible cable for raising said extension, means for holding said fender in raised position and means for tripping said means.

11. A fender having horizontal arms pivoted at their inner ends and uprights carried thereby forming a frame and a flexible scoop carried thereby, said arms and uprights being integrally connected outwardly of said pivoted ends, wheels on the ends of said arms, an extension frame pivoted to said arms centrally thereof and projecting therebeyond when lowered, a rigid controller rod for raising said fender, a flexible cable for raising said extension, means for holding said fender in raised position and means for tripping said means, said last means being foot operated.

12. In a fender, horizontal arms having integral uprights and a scoop member connected to said uprights and pivoted to said arms intermediate of their ends, arms forming a portion of said scoop member, and said last arms adapted to extend beyond said first arms.

13. A fender consisting of uprights, vertical and horizontal arms having pivotal connection therewith and a flexible scoop connected to said arms, wheels on said horizontal arms and a frame pivoted on said last arms.

14. A fender consisting of uprights, vertical and horizontal arms having pivotal connection therewith and a flexible scoop connected to said arms, wheels on said horizontal arms, and a frame on said last arms to which one end of said scoop is fixed.

15. A fender consisting of uprights, vertical and horizontal arms having pivotal connection therewith and a flexible scoop connected to said arms, wheels on said horizontal arms, and a frame on said last arms to which one end of said scoop is fixed, said frame being pivoted centrally of said last arms.

16. A fender consisting of uprights, vertical and horizontal arms having pivotal connection therewith and a flexible scoop connected to said arms, wheels on said horizontal arms, and a frame on said last arms to which one end of said scoop is fixed, said frame being pivoted centrally of said last arms, and adapted to project considerably beyond said last arms when in lowered position.

17. A fender consisting of uprights, vertical and horizontal arms having pivotal connection therewith and a flexible scoop connected to said arms, wheels on said horizontal arms, and a frame on said last arms to which one end of said scoop is fixed, said frame being pivoted centrally of said last arms, and adapted to project considerably beyond said last arms when in lowered position, said vertical arms and uprights being linked together.

18. A fender consisting of uprights, vertical and horizontal arms having pivotal connection therewith and a flexible scoop connected to said arms, wheels on said horizontal arms, a frame on said last arms to which one end of said scoop is fixed, said frame being pivoted centrally of said last arms, and adapted to project considerably beyond said last arms when in lowered position, said vertical arms and uprights being linked together, and means for actuating said fender.

19. A fender consisting of uprights, vertical and horizontal arms having pivotal connection therewith and a flexible scoop connected to said arms, wheels on said horizontal arms, a frame on said last arms to which one end of said scoop is fixed, said frame being pivoted centrally of said last arms, and adapted to project considerably beyond said last arms when in lowered position, said vertical arms and uprights being linked together, and means for actuating said fender.

20. A fender consisting of uprights, vertical and horizontal arms having pivotal connection therewith and a flexible scoop connected to said arms, wheels on said horizontal arms, a frame on said last arms to which one end of said scoop is fixed, said frame being pivoted centrally of said last arms, and adapted to project considerably beyond said last arms when in lowered position, said vertical arms and uprights being linked together, means for actuating said fender, and means for tripping said fender.

21. A fender consisting of uprights, vertical and horizontal arms having pivotal connection therewith and a flexible scoop connected to said arms, wheels on said horizontal arms, a frame on said last arms to which one end of said scoop is fixed, said frame being pivoted centrally of said last arms, and adapted to project considerably beyond said last arms when in lowered position, said vertical arms and uprights being linked together, means for actuating said fender, and means for tripping said fender, said last means being foot controlled.

22. A fender consisting of uprights, vertical and horizontal arms having pivotal connection therewith and a flexible scoop connected to said arms, wheels on said horizontal arms, a frame on said last arms to which one end of said scoop is fixed, said frame being pivoted centrally of said last arms, and adapted to project considerably beyond said last arms when in lowered position, said vertical arms and uprights being linked together, means for actuating said fender, means for tripping said fender, said last means being foot controlled, and means for folding said fender.

23. In a fender, horizontal arms having integral uprights and a scoop member connected to said uprights and pivoted to said arms intermediate of their ends, arms forming a portion of said scoop member, said last arms adapted to extend beyond said first arms, and wheels intermediate of said fender when in operative position.

24. In a fender, horizontal arms having integral uprights and a scoop member connected to said uprights and pivoted to said arms intermediate of their ends, arms forming a portion of said scoop member, said last arms adapted to extend beyond said first arms, and wheels intermediate of said fender when in operative position, said wheels being on the free ends of said first arms.

25. In a fender horizontal arms and a scoop extension frame pivoted intermediate thereof, said frame adapted to lie upon said arms, or to stand upright thereon, said arms being pivoted, and uprights connected with said arms to which said scoop is connected.

26. A fender having pivotally mounted horizontally disposed arms integral therewith, horizontally disposed arms pivoted to said first arms and a flexible scoop, wheels carried by said first arms intermediate of the horizontally extended ends of said first arms, and means on said vertical arms for operating said fender.

27. A fender having pivotally mounted horizontally disposed arms integral therewith, horizontally disposed arms pivoted to said first arms and a flexible scoop, wheels carried by said first arms intermediate of the horizontally extended ends of said first arms, and means on said vertical arms for operating said fender, said means consisting of an inflexible member.

28. A fender having pivotally mounted horizontally disposed arms integral therewith, horizontally disposed arms pivoted to said first arms and a flexible scoop, wheels carried by said first arms intermediate of the horizontally extended ends of said first arms, means on said vertical arms for operating said fender, said means consisting of an inflexible member, and a flexible member connected with said second arms whereby they may be raised.

29. A fender having pivotally mounted horizontally disposed arms integral therewith, horizontally disposed arms pivoted to said first arms and a flexible scoop, wheels carried by said first arms intermediate of the horizontally extended ends of said first arms, means on said vertical arms for operating said fender, said means consisting of an inflexible member, and a flexible member connected with said second arms whereby they may be raised, the tilting of said first arms being adapted to throw said second arms and scoop to lowered position.

30. In a fender horizontal arms and a scoop extension frame pivoted intermediate thereof, said frame adapted to lie upon said arms, or to stand upright thereon, said arms being pivoted, uprights connected with said arms to which said scoop is connected, and wheels on said arms.

31. In a fender horizontal arms and a scoop extension frame pivoted intermediate thereof, said frame adapted to lie upon said arms, or to stand upright thereon, said arms being pivoted, uprights connected with said arms to which said scoop is connected, and wheels on said arms, inwardly of the outer end of said extension when horizontally disposed.

32. In a fender horizontal arms and a scoop extension frame pivoted intermediate thereof, said frame adapted to lie upon said arms, or to stand upright thereon, said arms being pivoted, uprights connected with said arms to which said scoop is connected, wheels on said arms, inwardly of the outer end of said extension when horizontally disposed, and means for holding said wheels normally raised.

33. In a fender horizontal arms and a scoop extension frame pivoted intermediate thereof, said frame adapted to lie upon said arms, or to stand upright thereon, said arms being pivoted, uprights connected with said arms to which said scoop is connected, wheels on said arms, inwardly of the outer end of said extension when horizontally disposed, means for holding said wheels normally raised, and means for operating said last means.

34. In a fender horizontal arms and a scoop extension frame pivoted intermediate thereof, said frame adapted to lie upon said arms, or to stand upright thereon, said arms being pivoted, uprights connected with said arms to which said scoop is connected, wheels on said arms, inwardly of the outer end of said extension when horizontally disposed, means for holding said wheels normally raised, and means for operating said last means, said last means consisting of a spring controlled latch operating lever.

35. In a fender horizontal arms and a scoop extension frame pivoted intermediate thereof, said frame adapted to lie upon said arms, or to stand upright thereon, said arms being pivoted, uprights connected with said arms to which said scoop is connected, wheels on said arms, inwardly of the outer end of said extension when horizontally disposed, means for holding said wheels normally raised, means for operating said last means, said last means consisting of a spring controlled latch operating lever, and means for moving said uprights to vertical position.

36. In a fender horizontal arms and a scoop extension frame pivoted intermediate thereof, said frame adapted to lie upon said arms, or to stand upright thereon, said arms being pivoted, uprights connected with said arms to which said scoop is connected, wheels on said arms, inwardly of the outer end of said extension when horizontally disposed, means for holding said wheels normally raised, means for operating said last means, said last means consisting of a spring controlled latch operating lever, means for moving said uprights to vertical position, and means for moving said extension to a raised position.

37. In a fender horizontal arms and a scoop extension frame pivoted intermediate thereof, said frame adapted to lie upon said arms, or to stand upright thereon, said arms being pivoted, uprights connected with said arms to which said scoop is connected, wheels on said arms, inwardly of the outer end of said extension when horizontally disposed, means for holding said wheels normally raised, means for operating said last means, said last means consisting of a spring controlled latch operating lever, means for moving said uprights to vertical position, and means for moving said extension to a raised position, said last means consisting of a flexible cable.

38. In a fender horizontal arms and a scoop extension frame pivoted intermediate thereof, said frame adapted to lie upon said arms, or to stand upright thereon, said arms being pivoted, uprights connected with said arms to which said scoop is connected, wheels on said arms, inwardly of the outer end of said extension when horizontally disposed, means for holding said wheels normally raised, means for operating said last means, said last means consisting of a spring controlled latch operating lever, means for moving said uprights to vertical position, means for moving said extension to a raised position, said last means consisting of a flexible cable, and means for holding said extension raised.

39. In a fender horizontal arms and a scoop extension frame pivoted intermediate thereof, said frame adapted to lie upon said arms, or to stand upright thereon, said arms being pivoted, uprights connected with said arms to which said scoop is connected, wheels on said arms, inwardly of the outer end of said extension when horizontally disposed, means for holding said wheels normally raised, means for operating said last means, said last means consisting of a spring controlled latch operating lever, means for moving said uprights to vertical position, means for moving said extension to a raised position, said last means consisting of a flexible cable, and means for holding said extension raised, said last means consisting of a latch member.

40. In a fender horizontal arms and a scoop extension frame pivoted intermediate thereof, said frame adapted to lie upon said arms, or to stand upright thereon, said arms being pivoted, uprights connected with said arms to which said scoop is connected, wheels on said arms, inwardly of the outer end of said extension when horizontally disposed, means for holding said wheels normally raised, means for operating said last means, said last means consisting of a spring controlled latch operating lever, means for moving said uprights to vertical position, means for moving said extension to a raised position, said last means consisting of a flexible cable, and means for holding said extension raised, said last means consisting of a latch member, connected to said uprights.

41. In a fender horizontal arms and a scoop extension frame pivoted intermediate thereof, said frame adapted to lie upon said arms, or to stand upright thereon, said arms being pivoted, uprights connected with said arms to which said scoop is connected, wheels on said arms, inwardly of the outer end of said extension when horizontally disposed, means for holding said wheels normally raised, means for operating said last means, said last means consisting of a spring controlled latch operating lever, means for moving said uprights to vertical position, means for moving said extension to a raised position, said last means consisting of a flexible cable, and means for holding said extension raised, said last means consisting of a latch member, connected to said uprights, said extension frame being held suspended by said arms when in operative position.

In testimony whereof I affix my signature in presence of two witnesses.

WILLIAM JOHNSTON.

Witnesses:
J. W. BRYAN,
JAMES A. MAGILL.

Copies of this patent may be obtained for five cents each, by addressing the "Commissioner of Patents, Washington, D. C."